US012025031B2

(12) United States Patent
Iglewski

(10) Patent No.: US 12,025,031 B2
(45) Date of Patent: Jul. 2, 2024

(54) ACTUATION ASSEMBLY FOR A FAN OF A GAS TURBINE ENGINE

(71) Applicant: General Electric Company Polska Sp. z o.o., Warsaw (PL)

(72) Inventor: Tomasz Iglewski, Warsaw (PL)

(73) Assignee: General Electric Company Polska Sp. z o.o., Warsaw (PL)

( * ) Notice: Subject to any disclaimer, the term of this patent is extended or adjusted under 35 U.S.C. 154(b) by 0 days.

(21) Appl. No.: 18/081,266

(22) Filed: Dec. 14, 2022

(65) Prior Publication Data

US 2023/0358144 A1 Nov. 9, 2023

(30) Foreign Application Priority Data

May 6, 2022 (PL) ........................................ 441107

(51) Int. Cl.
*F01D 7/00* (2006.01)

(52) U.S. Cl.
CPC ............ *F01D 7/00* (2013.01); *F05D 2220/32* (2013.01); *F05D 2220/36* (2013.01)

(58) Field of Classification Search
CPC ...... F04D 29/666; F04D 29/362; F04D 29/36; F04D 29/364; F04D 29/366; F01D 7/00; B64C 11/04; B64C 11/06; F05D 2220/32; F05D 2220/36
See application file for complete search history.

(56) References Cited

U.S. PATENT DOCUMENTS

| | | | | |
|---|---|---|---|---|
| 8,235,324 | B1 | 8/2012 | Birch et al. | |
| 9,169,735 | B2 | 10/2015 | Stamps | |
| 10,077,102 | B1 | 9/2018 | Birch et al. | |
| 10,358,207 | B2 | 7/2019 | Miller et al. | |
| 10,654,558 | B2 | 5/2020 | Choi et al. | |
| 10,960,969 | B2 | 3/2021 | Choi et al. | |
| 2018/0339770 | A1 | 11/2018 | Brunken et al. | |
| 2019/0016441 | A1* | 1/2019 | Schank | B64C 27/30 |

(Continued)

FOREIGN PATENT DOCUMENTS

| | | | | |
|---|---|---|---|---|
| FR | 3109766 A1 | | 11/2021 | |
| GB | 2294094 A | * | 4/1996 | F01D 17/08 |
| WO | WO-2012131271 A1 | * | 10/2012 | B64C 11/308 |

OTHER PUBLICATIONS

Kufmann et al., Individual Blade Control of a 5-Bladed Rotor Using the Multiple Swashplate System, 43rd European Rotorcraft Forum, Milano Italy, Sep. 12-15, 2017, 17 Pages.

(Continued)

*Primary Examiner* — Sabbir Hasan
*Assistant Examiner* — Arthur Paul Golik
(74) *Attorney, Agent, or Firm* — Dority & Manning, P.A.

(57) ABSTRACT

A fan assembly is provided for a gas turbine engine including: a plurality of fan blades, the plurality of fan blades including a first fan blade; and an actuation assembly including: a first linkage connected to the first fan blade; a first pivot point rotatable with the first fan blade, the first linkage further connected to the first pivot point; a control point moveable relative to the first pivot point and connected to the first linkage for changing a relative position of the first fan blade within the plurality of fan blades.

20 Claims, 4 Drawing Sheets

(56) References Cited

U.S. PATENT DOCUMENTS

| | | | | |
|---|---|---|---|---|
| 2020/0407044 | A1 | 12/2020 | Wilson | |
| 2023/0060832 | A1 * | 3/2023 | Hall | F01D 7/02 |

OTHER PUBLICATIONS

Neuheuser et al., Assessment of Power Consumption of Helicopter Flight Control Systems Without Swashplate, Recent Advances in Aerospace Actuation System and Components, Toulouse, France, Nov. 24-26, 2004, 5 Pages.

Norman et al., Full-Scale Wind Tunnel Test of a UH-60 Individual Blade Control System for Performance Improvement and Vibration, Loads, and Noise Control, Computer Science, May 27, 2009, 20 Pages. https://rotorcraft.arc.nasa.gov/Publications/files/Norman_09AHS_IBC_Final_reva.pdf.

* cited by examiner

ACTUATION ASSEMBLY FOR A FAN OF A GAS TURBINE ENGINE

PRIORITY INFORMATION

The present application claims priority to Polish Patent Application Number P.441107 filed May 6, 2022.

FIELD

The present disclosure relates to an actuation assembly for a fan of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. In at least certain configurations, the turbofan engine may include an outer nacelle surrounding a plurality of fan blades of a fan of the fan assembly. The outer nacelle may provide benefits relating to noise and blade containment. However, inclusion of the outer nacelle may limit a diameter of the fan of the fan assembly, as with a larger diameter fan a size and weight of the outer nacelle generally increases as well.

Accordingly, certain turbofan engines may remove the outer nacelle. However, the inventors of the present disclosure have found that certain problems may arise with such a configuration, and that solutions to such problems would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
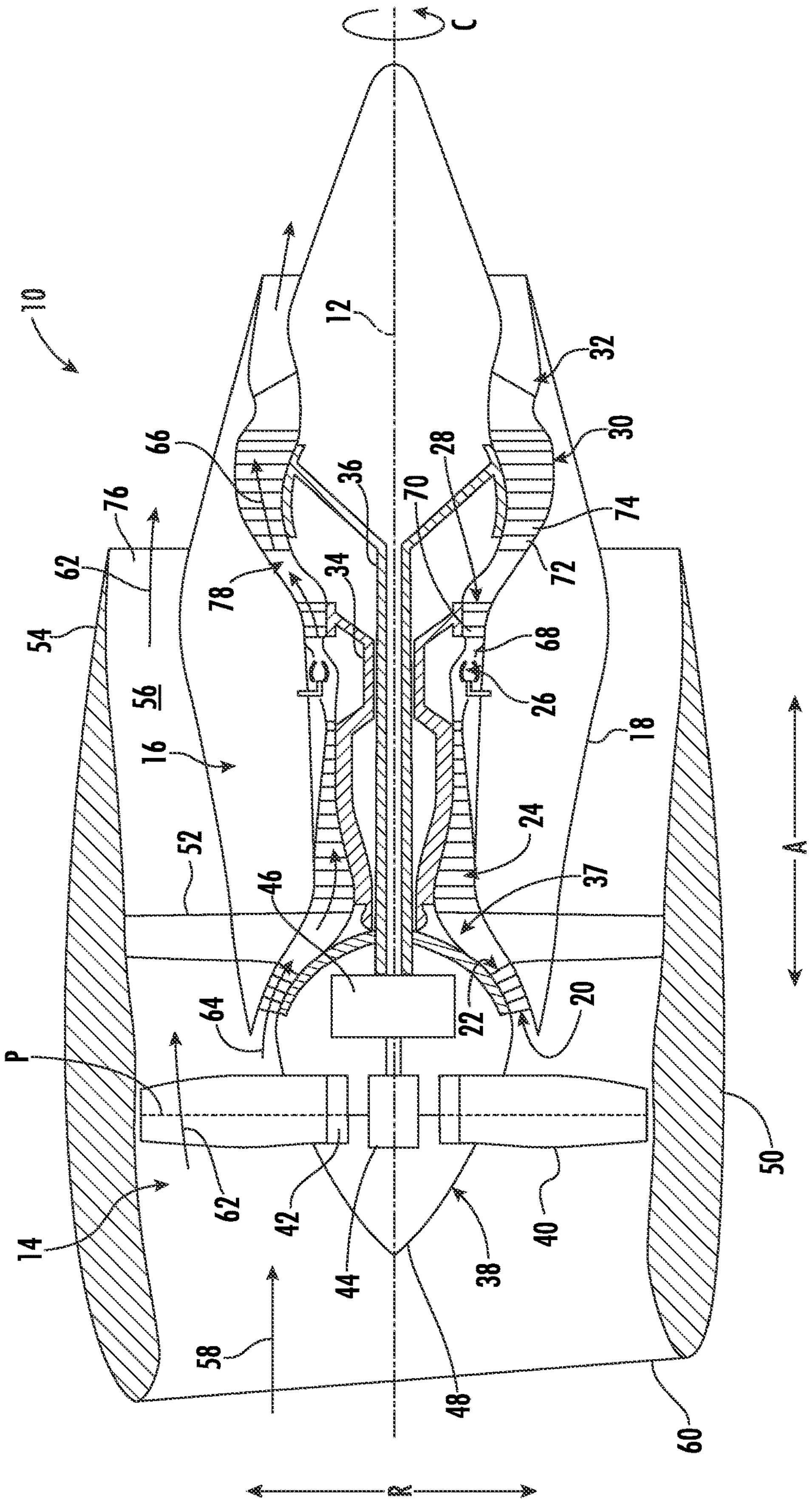
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The present disclosure is generally related to an actuation assembly for a fan assembly of a gas turbine engine and a gas turbine engine including the same. In at least certain exemplary embodiments, the fan assembly may be an unducted fan assembly, i.e., may not include an outer nacelle surrounding the fan assembly. During certain operations, an airflow may be received by the fan assembly that is misaligned with a fan axis of the fan assembly. For example, during operations where the gas turbine engine defines a high angle of attack, such as a takeoff or climb operation, the airflow received by the fan may be misaligned with the fan axis. Similarly, during low speed operations where there is a strong cross-wind, the airflow received by the fan may be misaligned with the fan axis. With such a configuration, the misaligned airflow may cause the fan blades at one side of the engine to have a higher loading than on an opposite side of the engine, causing undesirable forces to be enacted on the fan assembly and gas turbine engine at least once per revolution of the fan assembly (also referred to as "1P" loads).

In order to address this issue, the inventors have come up with an actuation assembly for the fan assembly capable of reconfiguring the fan blades to more equally distribute forces during an operating condition receiving airflow misaligned with the fan axis. In particular, the inventors have come up with an actuation assembly having a first linkage connected to the first fan blade; a first pivot point rotatable with the first fan blade, the first linkage connected to the first pivot point; a control point moveable relative to the first pivot point and connected to the first linkage for changing a relative position of the first fan blade within the plurality of fan blades.

In certain exemplary aspects, the control point is moveable between a neutral position, in which the fan blades all define an equal circumferential spacing, and an offset position, in which the fan blades define a varying circumferential spacing that changes based on a circumferential position of the respective fan blades. In such a manner, the actuation assembly may distribute the fan blades circumferentially to even out forces on the fan assembly and gas turbine engine despite an incoming airflow that is misaligned with the fan axis.

Referring now to the drawings, wherein identical numerals indicate the same elements throughout the Figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal axis 12 provided for reference), a radial direction R, and a circumferential direction C extending about the longitudinal axis 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal axis 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"), the front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine. Further, in still other exemplary embodiments, aspects of the present disclosure may be incorporated into, e.g., aeroderivative gas turbine engines, nautical gas turbine engines, wind turbines, etc.

Figure 2:
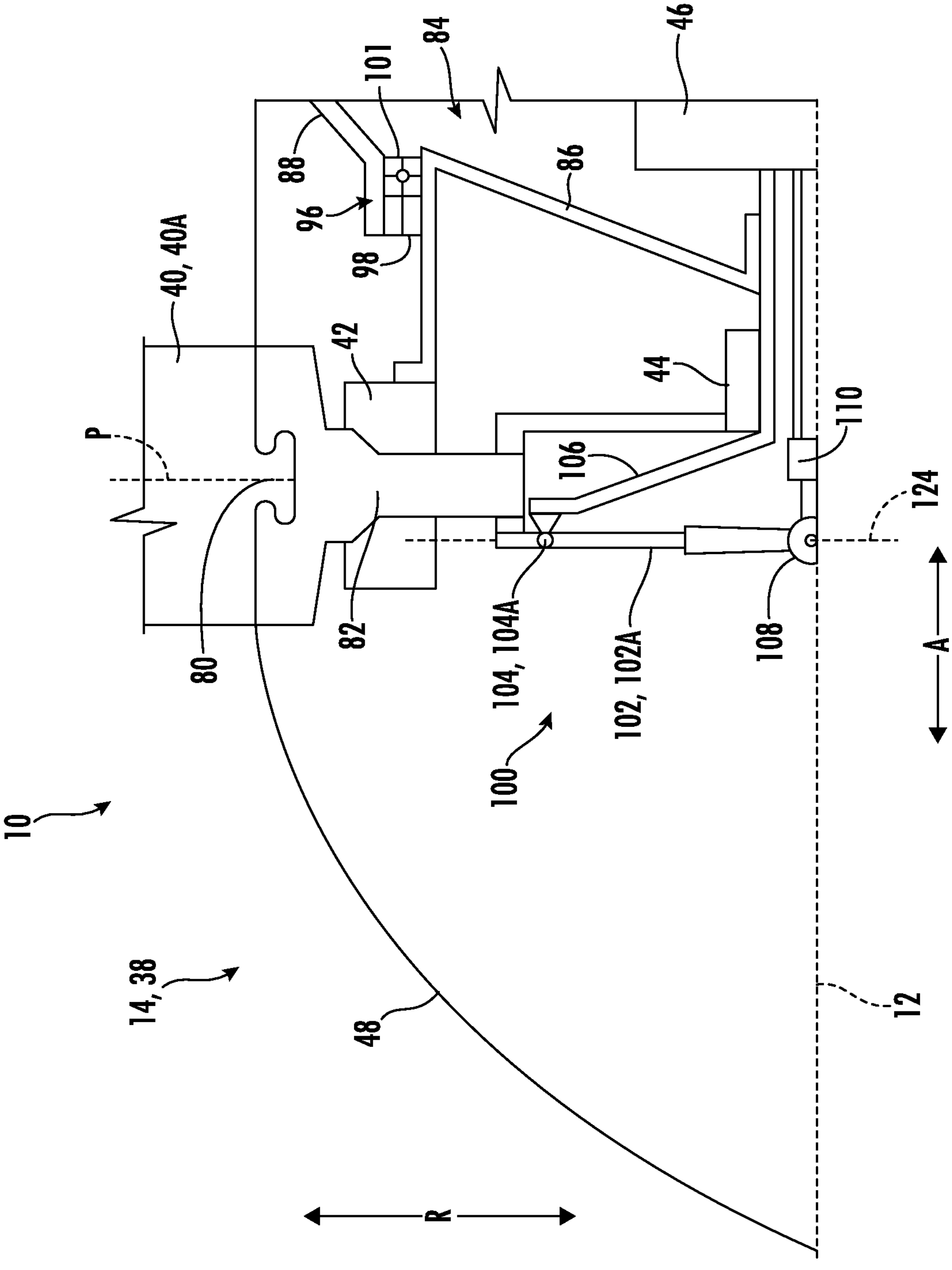
FIG. 2 is a schematic, cross-sectional view of a forward end of the exemplary gas turbine engine of FIG. 1.

Referring now to FIG. 2, a schematic, cross-sectional view of a forward end of a gas turbine engine 10 in accordance with an exemplary embodiment of the present disclosure is provided. Specifically, FIG. 2 provides a schematic, cross-sectional view of a fan section 14 of the gas turbine engine 10. In certain exemplary embodiments, the exemplary gas turbine engine 10 of FIG. 2 may be configured in substantially the same manner as exemplary gas turbine engine 10 of FIG. 1. Accordingly, the same or similar numbering may refer to the same or similar part.

As depicted in FIG. 2, the fan section 14 (also referred to herein as a "fan assembly") generally includes a fan 38 configured as a variable pitch fan having a plurality of fan blades 40 40 coupled to a disk 42. Briefly, it will be appreciated that the fan 38 is configured as a forward thrust fan configured to generate thrust for the gas turbine engine 10 (and, e.g., an aircraft incorporating the gas turbine engine 10) in a forward direction. The "forward direction" may correspond to a forward direction of an aircraft incorporating the gas turbine engine 10, and in the embodiment depicted is a direction pointing to the left.

Referring still to FIG. 2, each fan blade 40 includes a base 80 at an inner end along a radial direction R. Each fan blade 40 is coupled at the base 80 to the disk 42 via a respective trunnion mechanism 82. The trunnion mechanism 82 facilitates rotation of a respective fan blade 40 about a pitch axis P of the respective fan blades 40. For the embodiment depicted, the base 80 is configured as a dovetail received within a correspondingly shaped dovetail slot of the trunnion mechanism 82.

However, in other exemplary embodiments, the base 80 may be attached to the trunnion mechanism 82 in any other suitable manner. For example, the base 80 may be attached to the trunnion mechanism 82 using a pinned connection, or any other suitable connection. In still other exemplary embodiments, the base 80 may be formed integrally with the trunnion mechanism 82.

Further, as with the exemplary gas turbine engine 10 of FIG. 1, the fan 38 of the exemplary gas turbine engine 10 depicted in FIG. 2 is mechanically coupled to a turbomachine 16 (not depicted, see FIG. 1). More particularly, the exemplary variable pitch fan 38 of the gas turbine engine 10 of FIG. 2 is rotatable about a longitudinal axis 12 of the gas turbine engine 10 by an LP shaft 36 (not depicted, see FIG. 1) across a power gearbox 46. Specifically, the disk 42 is attached to the power gearbox 46 through a fan rotor 84, which includes one or more individual structural members 86 for the embodiment depicted. The power gearbox 46 is, in turn, attached to the LP shaft 36 (not depicted, see FIG. 1), such that rotation of the LP shaft correspondingly rotates the fan rotor 84 and the plurality of fan blades 40. Notably, as is also depicted, the fan section 14 additionally includes a front hub 48 (which is rotatable with, e.g., the disk 42 and plurality of fan blades 40).

Moreover, the fan 38 additionally includes a stationary fan frame 88 and one or more fan bearings 96 for supporting rotation of the various rotating components of the fan 38, such as the plurality of fan blades 40. More particularly, the fan frame 88 supports the various rotating components of the fan 38 through the one or more fan bearings 96. For the embodiment depicted, the one or more fan bearings 96 includes a forward roller bearing 98 and an aft ball bearing 101. However, in other exemplary embodiments, an other suitable number and/or type of bearings may be provided for supporting rotation of the plurality of fan blades 40. For example, in other exemplary embodiments, the one or more fan bearings 96 may include a pair (two) tapered roller bearings, or any other suitable bearings.

Additionally, the exemplary fan 38 of the gas turbine engine 10 includes a pitch change mechanism 44 for rotating each of the plurality of fan blades 40 about their respective pitch axes P.

Further, the exemplary fan 38 of the gas turbine engine 10 depicted in FIG. 2 further includes an actuation assembly 100. The actuation assembly 100 may generally be configured to move the plurality of fan blades 40 of the fan 38 between a uniform spacing in the circumferential direction C to a nonuniform spacing on the circumferential direction C, as will be explained in more detail below.

The actuation assembly 100 includes a plurality of linkages 102 connected to the respective plurality of fan blades 40. In particular, the actuation assembly 100 includes a first linkage 102A of the plurality of linkages 102 connected to a first fan blade 40A of the plurality of fan blades 40. More specifically, for the embodiment shown, the first linkage 102A is rigidly coupled to the trunnion mechanism 82, which is in turn coupled to the fan blade 40. The actuation assembly 100 further includes a first pivot point 104A rotatable with the first fan blade 40A, with the first linkage 102A also connected to the first pivot point 104A. In particular, for the embodiment shown, the first pivot point 104A is rotatable with the fan rotor 84, and more specifically is rigidly coupled to the fan rotor 84 through an extension arm 106. In such a manner first linkage 102A and the first pivot point 104A are configured to rotate with the plurality of fan blades 40 during operation of the fan section 14 (also referred to herein as a fan assembly).

Moreover, the exemplary actuation assembly 100 depicted further includes a control point 108. The control point 108 is depicted in FIG. 2 in a neutral position, but is configured to move along the radial direction R of the gas turbine engine 10 relative to a fan axis of the fan 38 (not separately labeled; aligned with the longitudinal axis 12) and the longitudinal axis 12 of the gas turbine engine 10. More particularly, the control point 108 is configured to move relative to the first pivot point 104A and is also connected to the first linkage 102A for changing a configuration of the plurality of fan blades 40, and more specifically, for changing a relative position of the first fan blade 40A within the plurality of fan blades 40, as described below.

For the embodiment depicted, the control point actuators 110 are provided to move the control point 108 relative to the longitudinal axis 12. The control point actuators 110 may be grounded to a static structure of the gas turbine engine 10 through the power gearbox 46.

Figure 3:
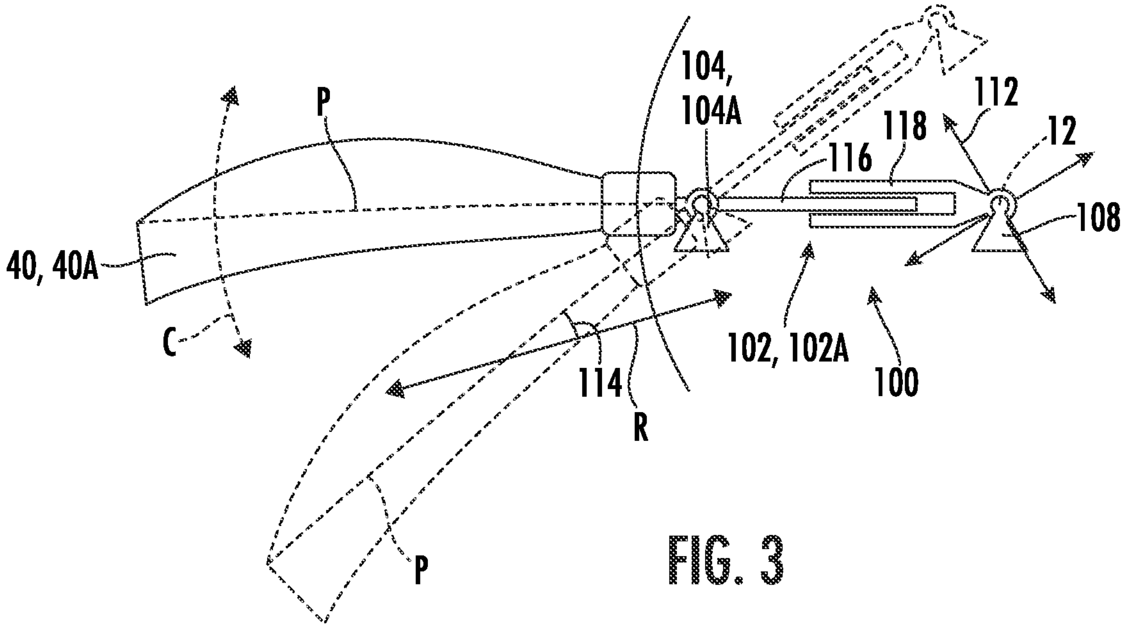
FIG. 3 is a view of a portion of a non-uniform blade actuator system in accordance with an exemplary aspect of the present disclosure, as viewed along a longitudinal axis of a gas turbine engine.

Referring now to FIG. 3, an isolated view of the first fan blade 40A and a subset of the actuation assembly 100 of FIG. 2 is provided, as viewed along the axial direction A of the gas turbine engine 10. As will be appreciated, the first fan blade 40A and actuation assembly 100 is depicted in a reference plane 124 (see FIG. 2) defined perpendicular to the longitudinal axis 12 of the gas turbine engine 10. As indicated by arrows 112, the control point 108 is configured to move relative to the longitudinal axis 12 within the reference plane 124. Movement of the control point 108 is configured to move the first linkage 102A to control an angle 114 of the first fan blade 40A relative to the radial direction R about the first pivot point 104A. In particular, when in the neutral position, as is depicted in FIG. 3, the angle 114 of the first fan blade 40A relative to the radial direction R about the first pivot point 104A may be equal to zero. The angle 114 is defined between the radial direction R and a pivot axis P of the first fan blade 40A FIG. 3 depicts in phantom the control point 108 moved to a nonuniform position away from the longitudinal axis 12.

When moved to the nonuniform position, the angle 114 defined by the fan blade 40 with the radial direction R about the first pivot point 104A may be greater than zero, such as greater than 5° and less than 45°, such as at least 7.5°, such as at least 10°, such as at least 15°, such as less than 30°, etc. The angle 114 may be defined by a pitch axis P of the first fan blade 40A with the radial direction R.

Notably, in order to facilitate such movement of the control point 108 relative to the longitudinal axis 12 of the gas turbine engine 10 within the reference plane 124, the actuator assembly 100 includes the first linkage 102A. More specifically, for the embodiment shown, the first linkage 102A includes a first member 116 and a second member 118. The first member 116 is slidable relative to the second member 118. More specifically, for the embodiment shown, the first member 116 is retractable within the second member 118.

In such a manner, the first linkage 102A may be a variable-length linkage to facilitate movement of the control point 108 relative to the first pivot point 104A within the reference plane 124. For example, when the control point 108 is in the neutral position, the first linkage 102A is longer than the first linkage 102A when the control point 108 is in the nonuniform position (depicted in phantom in FIG. 3). In such a manner, it will be appreciated that a length of the linkages 102 may change as the rotor turns relative to the control point 108. More specifically, the lengths of the linkages 102 change in a sinusoidal pattern once per revolution.

It will be appreciated, however, that in other exemplary embodiments of the present disclosure, one or more of the linkages 102 of the plurality of linkages 102 may be configured in any other suitable manner. For example, referring now to FIG. 4, a first fan blade 40A and actuation assembly 100 in accordance with another exemplary aspect of the present disclosure is provided. The exemplary first fan blade 40A and actuation assembly 100 of FIG. 4 may be configured in substantially the same manner as exemplary first fan blade 40A and actuation member of FIG. 3. For example, the actuation assembly 100 generally includes a first linkage 102A coupled to the first fan blade 40A, a first pivot point 104A rotatable with the first fan blade 40A (and the first linkage 102A further connected to the first pivot point 104A), and a control point 108 movable relative to the first pivot point 104A and relative to the longitudinal axis 12. The first linkage 102A is further connected to the control point 108.

Figure 4:
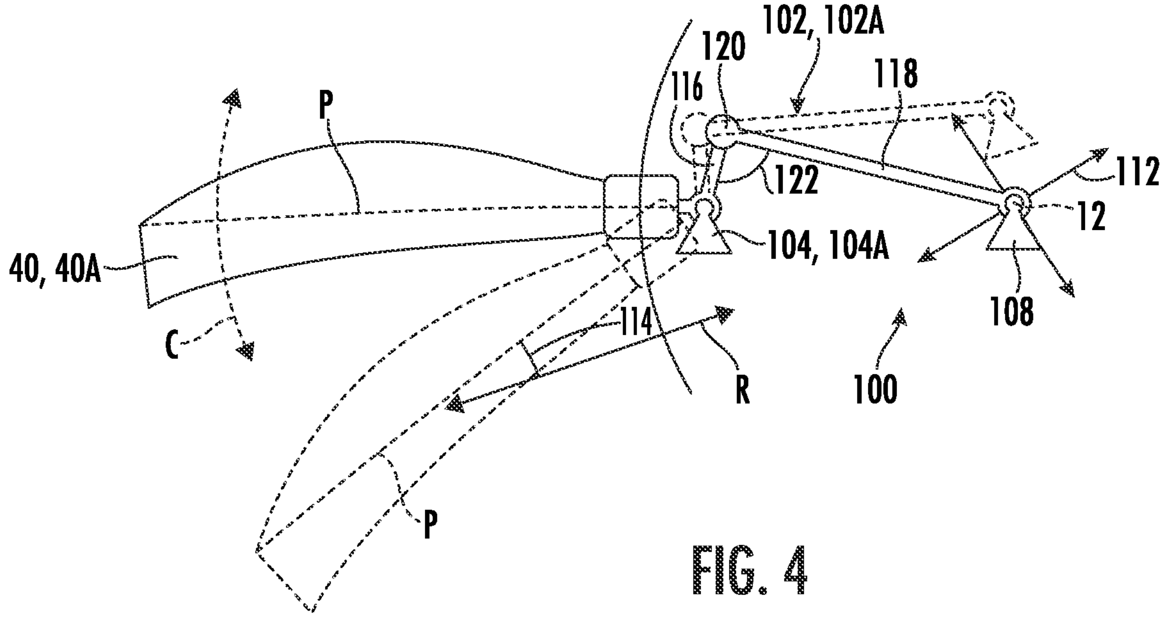
FIG. 4 is a view of a portion of a non-uniform blade actuator system in accordance with another exemplary aspect of the present disclosure, as viewed along a longitudinal axis of a gas turbine engine.

However, for the embodiment shown, the first linkage 102A is not a slidable linkage, but instead includes a pivot juncture 120. More specifically, the first linkage 102A includes a first member 116 and a second member 118, with the first member 116 pivotably connected to the second member 118 at the pivot juncture 120. The first member 116 defines an angle 122 with the second member 118 between 15° and 165°, for example. FIG. 4 depicts the actuation assembly 100 in a neutral position, and further depicts in phantom the first fan blade 40A and actuation assembly 100 in a nonuniform position with the control point 108 having been moved relative to the longitudinal axis 12 within a reference plane 124. The control point 108 may generally be moveable along any suitable direction within the reference plane 124, as indicated by arrows 112.

Figure 5:
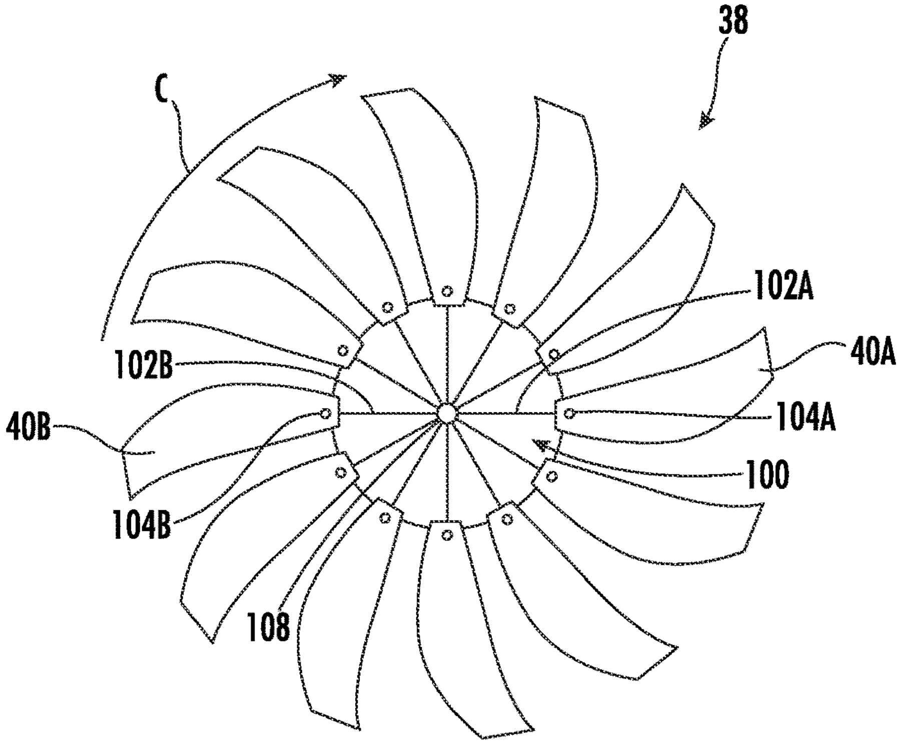
FIG. 5 is a schematic view of a fan section and an actuation assembly in accordance with an exemplary aspect of the present disclosure, with the actuation assembly depicted in a neutral position.
Figure 6:
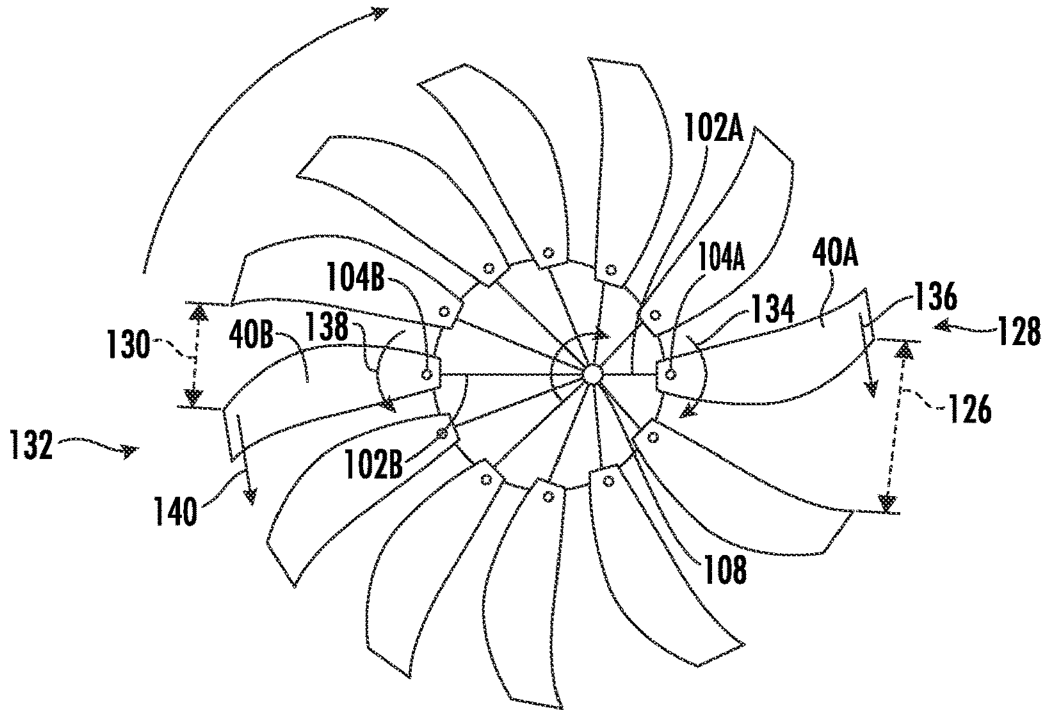
FIG. 6 is a schematic view of a fan section and an actuation assembly in accordance with an exemplary aspect of the present disclosure, with the actuation assembly depicted in an offset position.

Referring now to FIGS. 5 and 6, a fan section 14 in accordance with an exemplary aspect of the present disclosure is provided. The example fan section 14 of FIGS. 5 and 6 may be configured in a similar manner as the exemplary fan sections 14 described above with reference to FIGS. 2 through 4. In particular, the fan section 14 of FIGS. 5 and 6 includes a plurality of fan blades 40 and an actuation assembly 100. The actuation assembly 100 includes a plurality of linkages 102, with each linkage 102 coupled to a respective one of the plurality fan blades 40. Each linkage 102 of the plurality of linkages 102 may be configured in a similar manner as the first linkage 102A described above with respect to, e.g., FIG. 3 or FIG. 4.

Further, the actuation assembly 100 includes a plurality of pivot points 104 and a control point 108. Each of the plurality of pivot points 104 is rotatable with one of the respective plurality of fan blades 40. Each linkage 102 of the plurality of linkages 102 is connected to a respective pivot point 104 of the plurality of pivot points 104 and further is connected to the control point 108.

The control point 108 is movable relative to the plurality of pivot points 104 and is configured to change a relative position of at least one fan blade 40 within the plurality fan blades 40. Specifically, the control point 108 is movable within a reference plane 124 (defined perpendicularly to a longitudinal axis 12 of the gas turbine engine 10 incorporating the fan section 14; see FIG. 2; the plane depicted in FIGS. 5 and 6) relative to a fan axis (not labeled) and the longitudinal axis 12 of the gas turbine engine 10 incorporating the fan section 14 to change the configuration of the plurality of fan blades 40 of the fan 38.

In particular, referring particularly first to FIG. 5, the actuation assembly 100 is depicted in a neutral position, wherein the control point 108 is aligned with the longitudinal axis 12 of the gas turbine engine 10 incorporating fan section 14. When the actuation assembly 100 is in the neutral position, each of the fan blades 40 defines a uniform spacing along the circumferential direction C. More specifically, when the control point 108 is in the neutral position aligned with the longitudinal axis 12, the plurality of fan blades 40 define a first blade spacing 126 at a first circumferential position 128 and a second blade spacing 130 at a second circumferential position 132. The first blade spacing 126 is equal to the second blade spacing 130. The first and second blade spacings 126, 130 are each a linear distance between the tips of two adjacent fan blades 40 at the respective circumferential positions 128, 132.

By contrast, referring now particularly to FIG. 6, the actuation assembly 100 is depicted in an offset position (also referred to herein as a nonuniform position), and more specifically, the control point 108 is in an offset position, separated from the longitudinal axis 12 within the reference plane 124. When the actuation assembly 100 is in the offset position, the plurality of fan blades 40 define a nonuniform spacing along the circumferential direction C. More specifically, when the control point 108 is in the offset position separated from the longitudinal axis 12 within the reference plane 124, the plurality of fan blades 40 again define the first blade spacing 126 at the first circumferential position 128 and the second blade spacing 130 at the second circumferential position 132. However, when the actuation assembly 100 is in the offset position, the first blade spacing 126 is different than the second blade spacing 130.

It will be appreciated that by moving the control point 108 to the offset position, at least certain of the plurality of fan blades 40 define an angle with the radial direction R (see, e.g., angles 114 in FIGS. 3 and 4) as compared to when the control point 108 is in the neutral position. Said another way, blade yaw is introduced to at least certain of the plurality of fan blades 40 by moving the control point 108 to the offset position. A value for this angle or blade yaw may be dictated by an amount the control point 108 is moved away from the longitudinal axis 12 within the reference plane 124, a direction in which the control point 108 is moved away from the longitudinal axis 12 within the reference plane 124, a geometry of the plurality of linkages 102, or a combination thereof.

When the control point 108 is moved to the offset position, the circumferential spacing of the plurality of fan blades 40 and an angle of the plurality of fan blades 40 relative to the radial direction R is set for each individual circumferential location. More specifically, as the fan blades 40 rotate in the circumferential direction C, they move into a spacing and blade angle configuration for that particular circumferential location dictated by the offset position of the control point 108 and geometry of the linkages 102. In such a manner, it will be appreciated that as a first fan blade 40A of the plurality of fan blades 40 rotate along the circumferential direction C, the angle that the first fan blade 40A defines with the radial direction R changes from positive to negative and back, e.g., in a sinusoidal pattern. Similarly, as the first fan blade 40A of the plurality fan blades 40 rotates in the circumferential direction C, a spacing of the first fan blade 40A with a circumferentially adjacent fan blade 40 changes in a sinusoidal pattern as well.

As will be appreciated, changing the angles of the fan blades 40 relative to the radial direction R adds or subtracts to the fan blade's 40 angular speed. For example, the first fan blade 40A, positioned on a right side of in the view of FIG. 6, defines an angle with the radial direction R that is increasing as the first fan blade 40A rotates in the circumferential direction C, as indicated by arrow 134. As such, a rotational speed of the first fan blade 40A increases as the angle with the radial direction R increases. Such results in additional angular velocity of the first fan blade 40A and an additional linear velocity of the first fan blade 40A (see arrow 136), effectively decreasing an inflow angle within an oncoming airflow of the fan 38.

By contrast, referring still to FIG. 6, a second fan blade 40B of the plurality of fan blades 40, positioned on a left side in the view of FIG. 6, defines an angle with the radial direction R that is decreasing as the second fan blade 40B rotates in the circumferential direction C, as indicated by arrow 138. As such, a rotational speed of the second fan blade 40B decreases as the angle with the radial direction R also decreases. Such may result in a reduced angular velocity of the second fan blade 40B and a reduced linear velocity of the second fan blade 40B (see arrow 140). Such may effectively increase in inflow angle with the oncoming airflow of the fan 38.

These local changes in the fan 38 along the circumferential direction C may affect a load of the fan blades 40 based on the circumferential position of the respective fan blades 40. In such a manner, the fan blades 40 may be configured using the actuation assembly 100 to reduce 1P loads that attributable to oncoming airflows with the fan 38 defining an oblique angle with the longitudinal axis 12, be it from a steep angle of attack, a negative angle of attack, a starboard or port-side crosswind, etc.

Further aspects are provided by the subject matter of the following clauses:

A fan assembly for a gas turbine engine comprising: a plurality of fan blades, the plurality of fan blades including a first fan blade; and an actuation assembly comprising: a first linkage connected to the first fan blade; a first pivot point rotatable with the first fan blade, the first linkage further connected to the first pivot point; and a control point moveable relative to the first pivot point and connected to the first linkage for changing a relative position of the first fan blade within the plurality of fan blades.

The fan assembly of one or more of the previous clauses, wherein the first linkage and the first pivot point are configured to rotate with the plurality of fan blades.

The fan assembly of one or more of the previous clauses, wherein the first linkage comprises a first member and a second member, wherein the first member is slidable relative to the second member.

The fan assembly of one or more of the previous clauses, wherein the first linkage comprises a first member and a second member, wherein the first member defines an angle with the second member between 15 degrees and 165 degrees.

The fan assembly of one or more of the previous clauses, wherein the fan assembly defines a fan axis, wherein the control point is moveable relative to the fan axis.

The fan assembly of one or more of the previous clauses, wherein the fan assembly defines a reference plane perpendicular to the fan axis, wherein the control point is moveable relative to the fan axis within the reference plane.

The fan assembly of one or more of the previous clauses, wherein the actuation assembly further comprises a plurality of linkages and a plurality of pivot points, wherein each pivot point is rotatable with a respective fan blade of the plurality of fan blades, wherein each linkage of the plurality of linkages is connected to a respective fan blade of the plurality of fan blades, is connected to a respective pivot point of the plurality of pivot points, and is connected to the control point.

The fan assembly of one or more of the previous clauses, wherein the fan assembly defines a fan axis, wherein the control point is moveable relative to the fan axis to change a configuration of the plurality of fan blades.

The fan assembly of one or more of the previous clauses, wherein the control point is moveable to an offset position separated from the fan axis, wherein the plurality of fan blades define a first blade spacing at a first circumferential position and a second blade spacing at a second circumferential position when the control point is in the offset position, wherein the first blade spacing is different than the second blade spacing.

The fan assembly of one or more of the previous clauses, wherein the control point is moveable to a neutral position aligned with the fan axis, wherein the plurality of fan blades define a first blade spacing at a first circumferential position and a second blade spacing at a second circumferential position when the control point is in the neutral position, wherein the first blade spacing is equal to the second blade spacing.

A gas turbine engine comprising: the fan assembly of one or more of the previous clauses.

A gas turbine engine comprising: turbomachine; and a fan assembly rotatable by the turbomachine, the fan assembly comprising a plurality of fan blades and an actuation assembly, the plurality of fan blades including a first fan blade, and the actuation assembly comprising: a first linkage connected to the first fan blade; a first pivot point rotatable with the first fan blade, the first linkage connected to the first pivot point; and a control point moveable relative to the first pivot point and connected to the first linkage for changing a relative position of the first fan blade within the plurality of fan blades.

The gas turbine engine of one or more of the previous clauses, wherein the first linkage and the first pivot point are rotatable with the plurality of fan blades.

The gas turbine engine of one or more of the previous clauses, wherein the fan assembly defines a fan axis, wherein the control point is moveable relative to the fan axis.

The gas turbine engine of one or more of the previous clauses, wherein the fan assembly defines a reference plane perpendicular to the fan axis, wherein the control point is moveable relative to the fan axis within the reference plane.

The gas turbine engine of one or more of the previous clauses, wherein the actuation assembly further comprises a plurality of linkages and a plurality of pivot points, wherein each pivot point is rotatable with a respective fan blade of the plurality of fan blades, wherein each linkage of the plurality of linkages is connected to a respective fan blade of the plurality of fan blades, is connected to a respective pivot point of the plurality of pivot points, and is connected to the control point.

The gas turbine engine of one or more of the previous clauses, wherein the fan assembly defines a fan axis, wherein the control point is moveable to an offset position separated from the fan axis, wherein the plurality of fan blades define a first blade spacing at a first circumferential position and a second blade spacing at a second circumferential position when the control point is in the offset position, wherein the first blade spacing is different than the second blade spacing.

The gas turbine engine of one or more of the previous clauses, wherein the fan assembly defines a fan axis, wherein the control point is moveable to a neutral position separated from the fan axis, wherein the plurality of fan blades define a first blade spacing at a first circumferential position and a second blade spacing at a second circumferential position when the control point is in the neutral position, wherein the first blade spacing is equal to the second blade spacing.

An actuation assembly for a fan assembly of a gas turbine engine, the fan assembly comprising a plurality of fan blades, the plurality of fan blades including a first fan blade, the actuation assembly comprising: a first linkage configured to be connected to the first fan blade; a first pivot point rotatable with the first fan blade when the actuation assembly is installed in the gas turbine engine, the first linkage connected to the first pivot point; and a control point moveable relative to the first pivot point and connected to the first linkage for changing a relative position of the first fan blade within the plurality of fan blades when the actuation assembly is installed in the gas turbine engine.

The actuation assembly of one or more of the previous clauses, wherein the first linkage comprises a first member and a second member, wherein the first member is slidable relative to the second member.

The actuation assembly of one or more of the previous clauses, wherein the first linkage comprises a first member and a second member, wherein the first member defines an angle with the second member between 15 degrees and 165 degrees.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A fan assembly for a gas turbine engine comprising:

a plurality of fan blades configured to produce thrust as the plurality of fan blades are rotated about a fan axis, the plurality of fan blades including a first fan blade, the first fan blade defining an angle relative to a radial direction from the fan axis; and an actuation assembly comprising:

a first linkage connected to the first fan blade;

a first pivot point rotatable with the first fan blade, the first linkage further connected to the first pivot point; and a control point moveable relative to the first pivot point and connected to the first linkage, the first linkage configured to change a relative position of the first fan blade with respect to a neighboring fan blade of the plurality of fan blades;

wherein movement of the control point causes, via movement of the first linkage, a change in relative position of the first fan blade to produce a change in the angle of the first fan blade about the first pivot point, and wherein the change in angle occurs during operation of the plurality of fan blades to produce thrust.

2. The fan assembly of claim 1, wherein the first linkage and the first pivot point are configured to rotate with the plurality of fan blades.

3. The fan assembly of claim 1, wherein the first linkage comprises a first member and a second member, wherein the first member is slidable relative to the second member.

4. The fan assembly of claim 1, wherein the first linkage comprises a first member and a second member, wherein the first member defines an angle with the second member between 15 degrees and 165 degrees.

5. The fan assembly of claim 1, wherein the control point is moveable relative to the fan axis.

6. The fan assembly of claim 5, wherein the fan assembly defines a reference plane perpendicular to the fan axis, wherein the control point is moveable relative to the fan axis within the reference plane.

7. The fan assembly of claim 1, wherein the actuation assembly further comprises a plurality of linkages and a plurality of pivot points, wherein each pivot point of the plurality of pivot points is rotatable with a respective fan blade of the plurality of fan blades, wherein each linkage of the plurality of linkages is connected to the respective fan blade of the plurality of fan blades, is connected to a respective pivot point of the plurality of pivot points, and is connected to the control point.

8. The fan assembly of claim 7, wherein the control point is moveable relative to the fan axis to change a configuration of the plurality of fan blades.

9. The fan assembly of claim 8, wherein the control point is moveable to an offset position separated from the fan axis, wherein the plurality of fan blades define a first blade spacing at a first circumferential position and a second blade spacing at a second circumferential position when the control point is in the offset position, wherein the first blade spacing is different than the second blade spacing.

10. The fan assembly of claim 8, wherein the control point is moveable to a neutral position aligned with the fan axis, wherein the plurality of fan blades define a first blade spacing at a first circumferential position and a second blade spacing at a second circumferential position when the control point is in the neutral position, wherein the first blade spacing is equal to the second blade spacing.

11. A gas turbine engine comprising:

a turbomachine; and a fan assembly rotatable by the turbomachine, the fan assembly comprising a plurality of fan blades and an actuation assembly, the plurality of fan blades configured to produce thrust as the plurality of fan blades are rotated about a fan axis, the plurality of fan blades including a first fan blade, the first fan blade defining an angle relative to a radial direction from the fan axis, and the actuation assembly comprising:

a first linkage connected to the first fan blade;

a first pivot point rotatable with the first fan blade, the first linkage connected to the first pivot point; and a control point moveable relative to the first pivot point and connected to the first linkage, the first linkage configured to change a relative position of the first fan blade with respect to a neighboring fan blade of the plurality of fan blades;

wherein movement of the control point causes, via movement of the first linkage, a change in relative position of the first fan blade to produce a change in the angle of the first fan blade about the first pivot point; and wherein the change in angle occurs during operation of the plurality of fan blades to produce thrust.

12. The gas turbine engine of claim 11, wherein the first linkage and the first pivot point are rotatable with the plurality of fan blades.

13. The gas turbine engine of claim 11, wherein the control point is moveable relative to the fan axis.

14. The gas turbine engine of claim 13, wherein the fan assembly defines a reference plane perpendicular to the fan axis, wherein the control point is moveable relative to the fan axis within the reference plane.

15. The gas turbine engine of claim 14, wherein the actuation assembly further comprises a plurality of linkages and a plurality of pivot points, wherein each pivot point of the plurality of pivot points is rotatable with a respective fan blade of the plurality of fan blades, wherein each linkage of the plurality of linkages is connected to the respective fan blade of the plurality of fan blades, is connected to a respective pivot point of the plurality of pivot points, and is connected to the control point.

16. The gas turbine engine of claim 11, wherein the control point is moveable to an offset position separated from the fan axis, wherein the plurality of fan blades define a first blade spacing at a first circumferential position and a second blade spacing at a second circumferential position when the control point is in the offset position, wherein the first blade spacing is different than the second blade spacing.

17. The gas turbine engine of claim 11, wherein the control point is moveable to a neutral position aligned with the fan axis, wherein the plurality of fan blades define a first blade spacing at a first circumferential position and a second blade spacing at a second circumferential position when the control point is in the neutral position, wherein the first blade spacing is equal to the second blade spacing.

18. An actuation assembly for a fan assembly of a gas turbine engine, the fan assembly comprising a plurality of fan blades configured to produce thrust as the plurality of fan blades are rotated about a fan axis, the plurality of fan blades including a first fan blade, the first fan blade defining an angle relative to a radial direction from the fan axis, the actuation assembly comprising:

a first linkage configured to be connected to the first fan blade;

a first pivot point rotatable with the first fan blade when the actuation assembly is installed in the gas turbine engine, the first linkage connected to the first pivot point; and a control point moveable relative to the first pivot point and connected to the first linkage, the first linkage configured to change a relative position of the first fan blade with respect to a neighboring fan blade of the plurality of fan blades when the actuation assembly is installed in the gas turbine engine;

wherein movement of the control point causes, via movement of the first linkage, a change in relative position of the first fan blade to produce a change in the angle of the first fan blade about the first pivot point; and wherein the change in angle occurs during operation of the plurality of fan blades to produce thrust.

19. The actuation assembly of claim 18, wherein the first linkage comprises a first member and a second member, wherein the first member is slidable relative to the second member.

20. The actuation assembly of claim 18, wherein the first linkage comprises a first member and a second member, wherein the first member defines an angle with the second member between 15 degrees and 165 degrees.

* * * * *